United States Patent

[11] 3,575,617

[72] Inventor Joseph R. Burns
Trenton, N.J.
[21] Appl. No. 787,331
[22] Filed Dec. 27, 1968
[45] Patented Apr. 20, 1971
[73] Assignee RCA Corporation

[54] FIELD EFFECT TRANSISTOR, CONTENT ADDRESSED MEMORY CELL
10 Claims, 3 Drawing Figs.

[52] U.S. Cl. ........ 307/279, 307/247, 307/251, 307/304, 340/173
[51] Int. Cl. ........ H03k 3/26
[50] Field of Search ........ 307/205, 246, 247, 251, 279, 304; 340/173

[56] References Cited

UNITED STATES PATENTS 3,389,383 6/1968 Burke et al. ........ 307/279X

OTHER REFERENCES

Keller, Integrated Fast-Read, Slow-Write Memory Cell Insulated Gate Field-Effect Transistors, I.B.M. Techinical Disclosure Bulletin, Vol. 10, No. 1, June 1967, pp 85 & 86. 307/279

*Primary Examiner*—Stanley T. Krawczewicz
*Attorney*—John V. Regan

ABSTRACT: A field-effect transistor flip-flop and three lines coupled through other field effect transistors to the flip-flop for permitting information to be read from and written into the flip-flop nondestructively and for producing, in response to a voltage indicative of a tag bit applied to one of said lines, a signal indicative of a match or mismatch on another of said lines.

The invention described herein was made in the course of or under a contract or sub-contract thereunder with the Department of the Air Force.

INVENTOR
JOSEPH R. BURNS

BY Samuel Cohen
ATTORNEY

FIELD EFFECT TRANSISTOR, CONTENT ADDRESSED MEMORY CELL

BACKGROUND OF THE INVENTION

There is a need in the data processing field for a content addressed memory cell which can be integrated, which uses little standby power, whose contents readily can be altered and which operates at a relatively high speed. The object of the present invention is to provide a circuit which meets this need.

SUMMARY OF THE INVENTION

A field effect transistor flip-flop and field effect transistor means coupling two digit lines and a word line to said flip-flop for permitting nondestructive read and write and for permitting also the production of match and mismatch signals. Match or mismatch signals are obtained via at least one path comprising the conduction channels of two transistors connected between a terminal of the power supply and the word line. One transistor unconditionally conducts and the other's state is controlled by whether or not there is a match between the stored bit and the tag bit represented by the voltages on the digit lines.

DETAILED DESCRIPTION

The transistors employed in the memory cell of the present invention are field effect transistors of the metal oxide semiconductor (MOS) type. Each such transistor includes a source electrode, a drain electrode, a conduction channel between these electrodes and a gate electrode for controlling the impedance exhibited by the channel.

Figure 1:
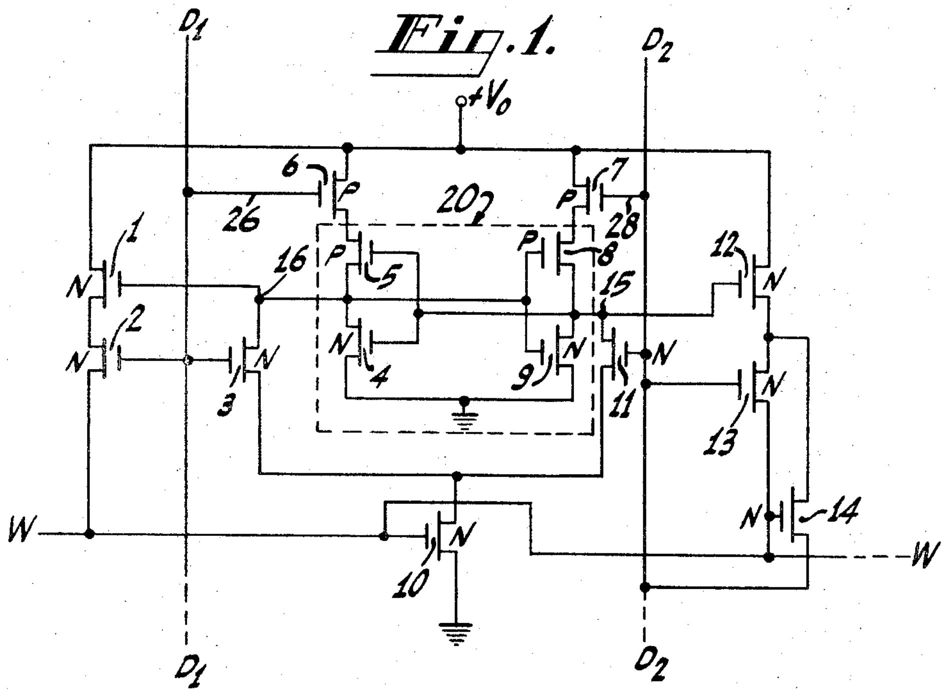
FIG. 1 is a schematic diagram of a memory cell according to the invention.

The circuit of FIG. 1 includes both N and P type transistors. For an N type transistor of the type shown, when the gate electrode is made relatively positive with respect to the source electrode, its conduction channel exhibits a low value of impedance and the drain electrode assumes a potential close to that of the source electrode. When the gate electrode is negative relative to the source electrode, the channel impedance is extremely high. The P type field effect transistor operates in the same way but in response to voltages opposite in polarity to those employed for the N type transistor.

For purposes of the following discussion, the convention arbitrarily is adopted that a relatively positive voltage such as +10 volts, represents the binary digit (the bit) 1 and a relatively negative voltage level, such as ground potential represents the bit zero. For the sake of brevity, it is sometimes stated in the following explanation that a 1 or 0 is applied to a transistor or a lead rather than saying that a voltage representing a 1 or 0 is applied to the transistor or lead. Also, in some cases, a lead and the signal applied to the lead are identified by the same letter.

The circuit of FIG. 1 includes 14 MOS transistors 1—14. Ten of the transistors are of N type and four of the transistors, namely 5,6,7 and 8, are of the P type. At the center of the FIG., the four transistors 4, 5, 8 and 9 within dashed block 20 are crosscoupled and operate as a flip-flop. The function of the remaining transistors is to permit information to be read from and written into the flip-flop and also to permit a "match" or "mismatch" signal to be coupled to external circuits. All signals applied to and received from the cell of FIG. 1 are conducted by one or more of three lines, two digit lines $D_1$ and $D_2$ and a word line W. This will be explained in detail below.

The way in which information is written into the memory cell of FIG. 1 is given in Table I below. In this table and in the other tables which follow, only those transistors which are significant to the operation are listed.

TABLE I

| W | $D_1$ | $D_2$ | 3 | 4 | 5 | 6 | 7 | 8 | 9 | 10 | COMMAND |
|---|---|---|---|---|---|---|---|---|---|---|---|
| 1 | 1 | 0 | ON | ON | OFF | OFF | ON | ON | OFF | ON | Write 1. |
| 1 | 0 | 1 | OFF | OFF | ON | ON | OFF | OFF | ON | ON | Write 0. |

From the table above it may be observed that when it is desired to write information into the memory cell, a 1, that is, a voltage of approximately +10 volts is applied to the W line. Concurrently, a 1 is applied to one of the D lines and a 0 is applied to the other D line. If it is desired to write a 1, $D_1$ is made equal to 1 (+10 volts) and $D_2$ is made equal to 0 (is maintained at ground potential). The 1 present on line $D_1$ cuts off transistor 6. This disconnects transistor 5 from the power supply, indicated by the voltage $+V_o$. In practice, $V_o$ may equal +10 volts or so. The 1 present on line $D_1$ turns on transistor 3 and the 1 present on line W turns on transistor 10. Thus circuit point 16 is connected through conducting transistors 3 and 10 to ground.

The 0 present on line $D_2$ turns on transistor 7 and turns off transistor 11, and the 0 present at point 16 turns on transistor 8. Thus, point 15 assumes a value of approximately +10 volts as it is connected to the power supply voltage $+V_o$ through conducting transistors 7 and 8.

Transistor 4 is turned on by the +10 volts present at point 15 and transistor 5 is turned off by this same voltage. Transistor 9 is turned off by the ground potential present at point 16. Thus, the flip-flop 20 is in a stable state indicative of storage of the bit 1.

From the analysis above, it should be clear what occurs when W=1, $D_1$=0 and $D_2$=1. Now transistor 6 goes on and transistor 7 goes off. Transistor 11 goes on as its gate electrode is relatively positive. The flip-flop assumes the state in which transistors 5 and 9 are on and transistors 4 and 8 are off and this state represents storage of the bit zero.

If $D_1$=$D_2$W=0, the flip-flop continues to store the information present in the flip-flop. For example, assume the flip-flop is storing 1, that is, 8 and 4 on and 5 and 9 off. As $D_2$ is 0, transistor 7 is on so that the power supply voltage $V_o$ continues to be connected to transistor 8 and point 15 remains at approximately +10 volts. This voltage, applied to the gate electrode of transistor 4, maintains transistor 4 on. Thus, ground is connected through transistor 4 to terminal 16, that is, to the gate electrode of transistor 8 maintaining this transistor on. In other words, the transistor "locks-up" and continues to store whatever information is present.

The conducting transistors 7 and 8 (or 6 and 5, when storing a 0) dissipate extremely small amounts of power so that, in the standby condition, even in a full size memory made up of hundreds or thousands of cells such as shown in FIG. 1, there is very little power drawn.

The read operation is given in Table II below. The first row of the table corresponds to reading a stored 1 (a sense current is produced at $D_2$); the second row of the table corresponds to reading a stored 0 (no sense current is produced at $D_2$.

TABLE II

| W | $D_1$ | $D_2$ | 1 | 2 | 4 | 5 | 6 | 7 | 8 | 9 | 12 | 14 |
|---|---|---|---|---|---|---|---|---|---|---|---|---|
| 1 | 0 | 0 | OFF | OFF | ON | OFF | ON | ON | ON | OFF | ON | ON. |
| 1 | 0 | 0 | ON | OFF | OFF | ON | ON | ON | OFF | ON | OFF | ON. |

As may be observed from Table II, to read the contents of the memory cell of FIG. 1, the following conditions are made to exist: W=1 and $D_1=D_2 0$. The W=1 turns on transistors 10 and 14. If the flip-flop 20 is storing a 1, transistors 7 and 8 both conduct and point 15 is at +10 volts. This turns on transistor 12 and current is conducted through transistors 12 and 14 to line $D_2$. Thus, during the read operation line $D_2$ is the sense line, and a current (a sense signal) present on this line, as just described, represents storage of the bit 1. (Note that line $D_2$, during the read operation, is connected to a low impedance input circuit (not shown) of a sense amplifier (not shown) so that the voltage present on this line does not change appreciably.)

If, under the same circumstances as discussed above, the memory cell of FIG. 1 is storing a 0, no sense signal (current) is induced on line $D_2$. When the flip-flop 20 is storing a 0, transistor 8 is off and transistor 9 is on. Circuit terminal 15 is therefore at ground and this cuts off transistor 12. Thus transistor 12 prevents the voltage $V_o$ from being applied through the channel of transistor 12 to the "drain" electrode of transistor 14. Accordingly, even though transistor 14 is on, no current is conducted by this transistor to the sense line $D_2$.

Table III below illustrates, in part, the operation of the cell of FIG. 1 as a content addressed, or associative memory cell. Both rows of the table represent the question: "Is there a stored 1?" In row 1, the answer is "yes" and W carries no current. In row 2, the answer is "no" and current flows through transistors 1 and 2 to W to indicate a "mismatch."

TABLE III

| W | $D_1$ | $D_2$ | 1 | 2 | 4 | 5 | 8 | 9 | 12 | 13 |
|---|---|---|---|---|---|---|---|---|---|---|
| 0 | 1 | 0 | Off | On | On | Off | On | Off | On | Off. |
| 0 | 1 | 0 | On | On | Off | On | Off | On | Off | On. |

As the Table above indicates, in this mode of operation no voltage is applied to the W lead (W=0) and a tag bit is applied to one of the two D leads. As mentioned above, each row of the table illustrates the case in which the tag bit $D_1=1$, $D_2=0$ asks the question "Is there a stored 1?" If, in this case, there is in fact a stored 1, then there will be no signal current in the W line. No signal applied to the W line indicates a "match," that is, it indicates that the stored bit is equal to the tag bit.

If, when the tag bit is 1, ($D_1=1$, $D_2=0$) and a 1 is being stored, then transistor 8 is on and transistor 7 is on. The +10 volts present at terminal 15 maintains transistor 4 on so that terminal 16 is at ground potential. This turns transistor 1 off, opening the path between the supply voltage $+V_o$ and transistor 2. Transistor 2 is turned on by the 1 applied to its gate electrode. However, as transistor 1 is off, no current flows to line W.

Assume the same set of conditions as above, that is, $D_1=1$ and $D_2=0$ and flip-flop 20 storing a 0. Transistors 5 and 9 are on and transistors 8 and 4 are off. The 1 present on line $D_1$ turns off transistor 6 and turns on transistor 2. While it might appear that the turning off of transistor 6 would affect the voltage at point 16, this is not the case. The voltage at point 16 initially is high, of the order of +10 volts. When transistor 6 is cutoff, the power supply voltage $+V_o$ is disconnected from transistor 5. However, point 16 remains at +10 volts because it is connected to ground only through the high impedances of nonconducting transistors 10 and 9. These transistors act as capacitors which remain charged to the voltage present at point 16. Thus, the +10 volts present at point 16 turns transistor 1 on. As transistors 1 and 2 are both on, the voltage $V_o$ is coupled to the W line and this voltage manifests a mismatch condition.

An analysis similar to the above can be made for the case in which W=0, $D_1=0$ and $D_2=1$. This combination of values represents a tag bit which asks the question: "Is there a 0 stored in the flip-flop 20?" If there is a 0 stored, transistor 12 will be cut off. If there is a 1 stored, both transistors 12 and 13 will conduct and a mismatch signal produced by current flow from the power supply represented by $V_o$ to the W line will appear on the W line.

Figure 2:
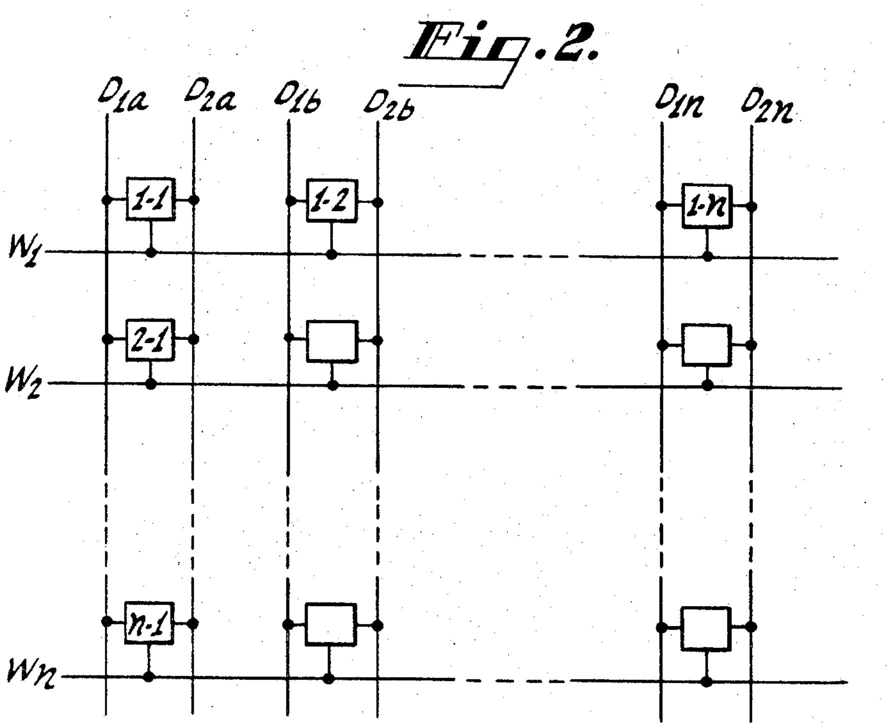
FIG. 2 is a block diagram of a content-addressed memory which includes as the storage elements thereof the cells of FIG. 1.

A content address memory embodying the invention is shown in block diagram form in FIG. 2. Each square, such as 1-1, 1—2, 2—1, and so on, represents a memory cell such as shown in FIG. 1. This memory may be addressed a word at a time by applying a signal to one of the word lines W concurrently with the application of signals to the various D lines in the manner already indicated. Thus in word organized fashion, information may be read from or written into the memory. To interrogate the memory in content-addressed fashion, one or more tag bits are concurrently applied to the columns of memory and no voltages are applied to the word lines W, all as already discussed in connection with FIG. 1. A tag bit is represented by $D_{1j}=1$, $D_{2j}=0$ or $D_{1j}=0$, $D_{2j}=1$, where j represents any column a through n. The condition $D_{1j}=D_{2j}=1$ is not permitted.

Figure 3:
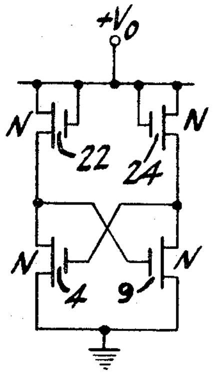
FIG. 3 shows a portion of the circuit of FIG. 1 modified to permit use of transistors all the same conductivity type.

The circuit of FIG. 1 readily may be integrated by known techniques. For example, a complete memory consisting of many (several hundred or several thousand cells) may be fabricated with both P and N type devices such as shown in FIG. 1 with "silicon or sapphire" fabrication techniques. However, as an alternative, the cell may be made using all transistors of the same type, such as all N type transistors. The modification which is necessary is shown in FIG. 3. The transistor 22 is a single N type transistor which replaces the two transistors 5 and 6 of FIG. 1. The transistor 24 replaces the two transistors 7 and 8 of FIG. 1. These transistors, in each case, are connected gate-to-drain electrode and, as is well understood in this art, they each operate as a load resistor. The dimensions of transistors 22 and 24 are so chosen that they exhibit a resistance which is roughly 10 times that of the flip-flop transistor. For example, transistor 22 may have a value of resistance 10 times greater than that of transistor 4.

With the circuit modified as illustrated in FIG. 3, the connections such as 26 and 28 in FIG. 1 may, of course, be omitted. While the circuit modified as shown in FIG. 3 does have the advantage that it can be integrated in more different ways than the circuit of FIG. 1, and it has the further advantage that two less transistors are required for the storage cell, it has the disadvantage of dissipating somewhat more power than the unmodified cell of FIG. 1.

I claim:

1. In combination:

a content addressed memory cell for storing a manifestation of one of binary 1 and binary 0;

two digit lines and a word line coupled to said cell;

means in said cell responsive to a voltage representing binary 1 on the word line and to a voltage representing a binary 0 on at least one of the digit lines for writing into and reading from said memory cell the information stored therein; and means in said cell responsive to a voltage representing binary 0 on the word line and a voltage representing binary 1 on only one of said digit lines for producing an indication on said word line of whether or not the information stored in said cell matches the information represented by said binary 1 on said digit line.

2. In combination:

a field effect transistor flip-flop which in one state produces a voltage representing binary 1 at a first output terminal and a voltage representing binary 0 at a second output terminal and in its second state produces the reverse voltage conditions;

a voltage source coupled to said flip-flop;

two digit lines and a word line;

and field effect transistor means coupled to said lines and responsive to the following set of voltages: (a) a voltage representing the binary digit 1 on one digit line, (b) a voltage representing the binary digit 0 on the other digit line, and (c) a voltage representing the binary digit 0 on said word line, for providing a path between said voltage source and said word line comprising the series connected channels of two transistors, the first channel unconditionally having a low value of impedance in response to the voltage on one of the digit lines and the second channel coupled to said flip-flop, and having a value of impedance which is controlled by the state of the flip-flop, that is, which is dependent upon whether there is a match or mismatch between the bit represented by the voltages on the digit lines and the stored bit, whereby in one condition of the flip-flop, said second channel, and therefore said path, exhibits a low value of impedance and conducts a signal from said source to said word line and in the other condition of the flip-flop, said second channel and therefore said path exhibits a high impedance and does not conduct a signal to the word line.

3. In the combination as set forth in claim 2, the gate electrode of the transistor having said second channel being connected to one output terminal of said flip-flop and the gate electrode of the transistor having said first channel being connected to one of said digit lines.

4. In the combination as set forth in claim 3, said field effect transistor means further including third and fourth field effect transistors the conduction paths of which are connected in series between said voltage source and said word line, the gate electrode of said third transistor being connected to the other output terminal of said flip-flop, and the gate electrode of said fourth transistor being connected to the other of said digit lines.

5. A content addressable memory cell comprising, in combination;

a flip-flop coupled to a supply terminal for an operating voltage source and having first and second output terminals at which complementary outputs are produced;

a path between the said first output terminal and a point of reference potential comprising the series connected conduction paths of first and second field effect transistors, the first transistor being connected to the first output terminal at one end of its path and the second transistor being connected to said point of reference potential at the other end of its path;

a path between said second output terminal and the connection between the conduction paths of said first and second transistors comprising the conduction path of a third field effect transistor;

a word line connected to the gate electrode of said second transistor;

a third path comprising the series connected conduction paths of fourth and fifth field-effect transistors connected between said supply terminal and said word line, the gate electrode of said fourth transistor being connected to said fourth output terminal;

a fourth path comprising the series connected conduction paths of sixth and seventh field-effect transistors connected between said supply terminal and said word line, the gate electrode of said sixth transistor being connected to said second output terminal;

a first bit line connected to the gate electrodes of the first and fifth transistors; and a second bit line connected to the gate electrodes of the third and seventh field effect transistors.

6. A cell as set forth in claim 5 wherein said flip-flop is formed of transistors of opposite conductivity type and said first through said seventh transistors are all of the same conductivity type.

7. A cell as set forth in claim 4 wherein the flip-flop and all of the remaining transistors are all of the same conductivity type.

8. A cell as set forth in claim 5 wherein said flip-flop comprises two conduction paths, each comprising the conduction channel of a P-type field effect transistor in series with that of an N-type transistor, with the gate electrodes of the transistors in each path connected to the connection between the N and P-type transistors in the opposite path.

9. A cell as set forth in claim 8, further including:

an eighth transistor the conduction path of which connects said supply terminal to the end of one conduction of said flip-flop, the gate electrode of said eighth transistor being connected to said first bit line; and a ninth transistor the conduction path of which connects said supply terminal to the end of the other conduction path of said flip-flop, the gate electrode of said ninth transistor being connected to said second bit line.

10. A cell as set forth in claim 5 further including:

a field-effect transistor whose conduction path is connected between said second digit line and the connection between the conduction paths of the sixth and seventh transistors and whose gate electrode is connected to said word line.